E. I. HEINSOHN.
METHOD OF AND APPARATUS FOR ELECTRIC WELDING.
APPLICATION FILED FEB. 21, 1914.
1,119,079.
Patented Dec. 1, 1914.
2 SHEETS—SHEET 1.
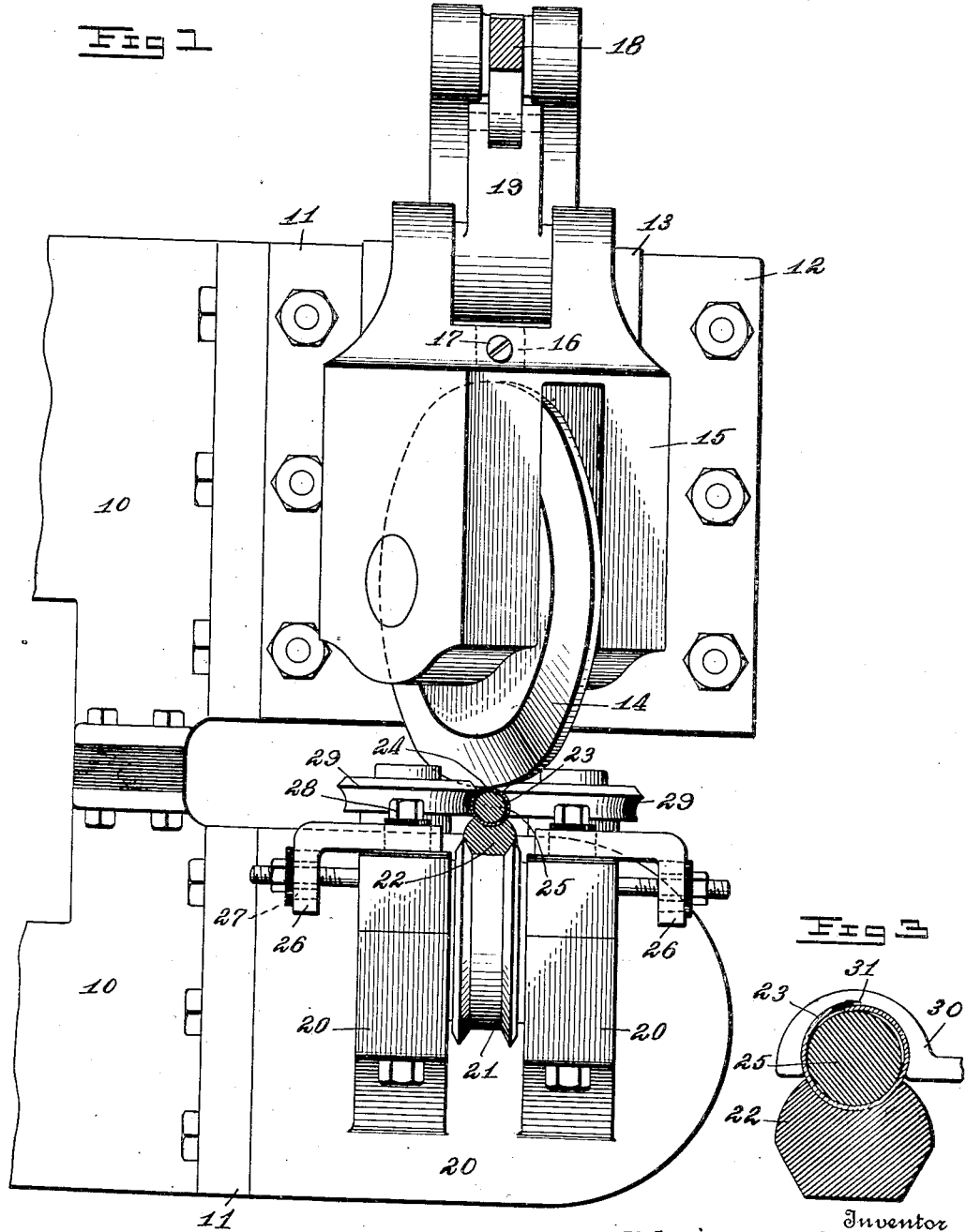
Witnesses
H. C. Robinette
G. M. Strecker
Inventor
Edwin I. Heinsohn
By Meyers, Cushman & Rea
Attorney

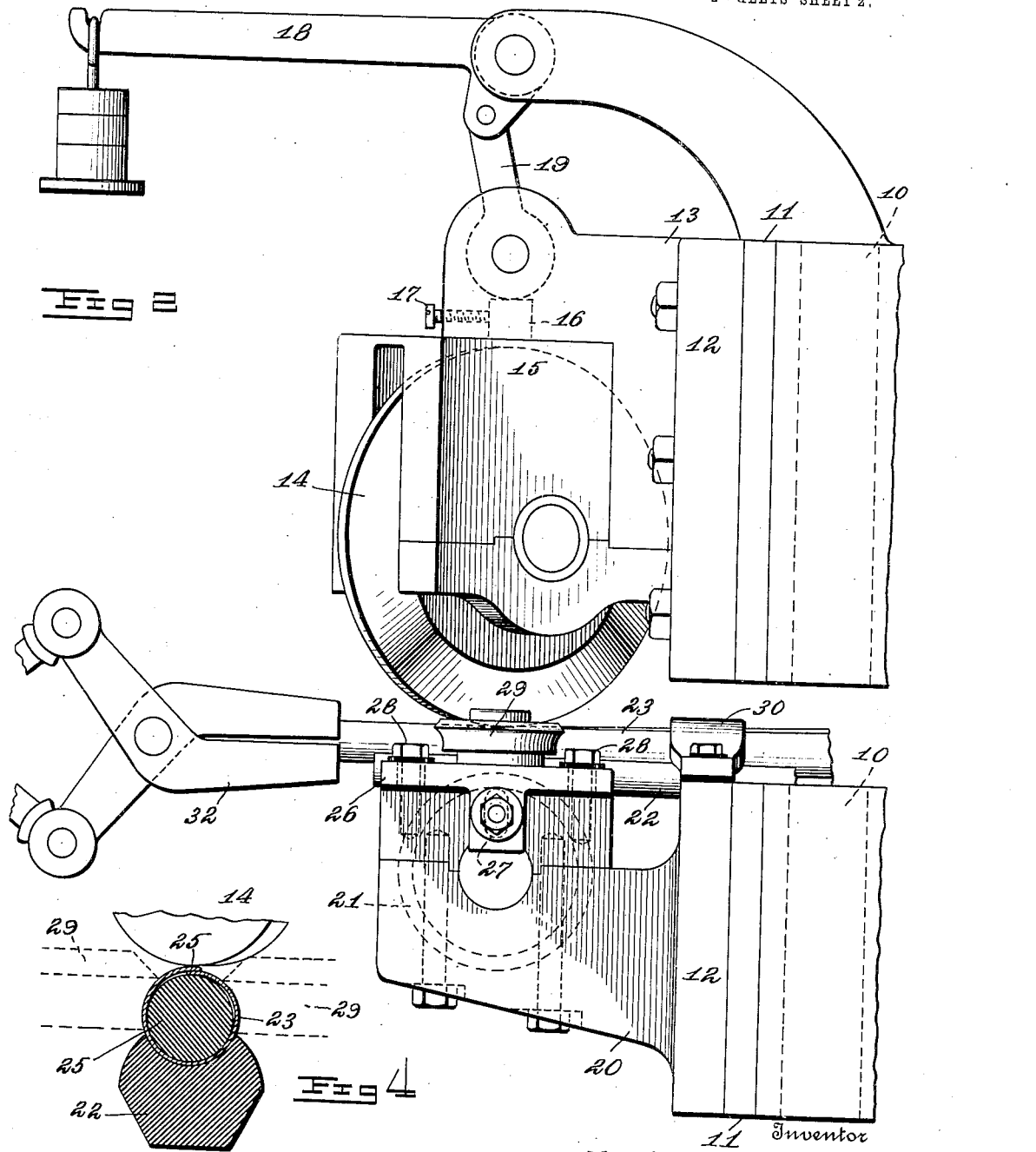

UNITED STATES PATENT OFFICE.

EDWIN I. HEINSOHN, OF CLEVELAND, OHIO.

METHOD OF AND APPARATUS FOR ELECTRIC WELDING.

1,119,079.  Specification of Letters Patent.  Patented Dec. 1, 1914.

Application filed February 21, 1914. Serial No. 820,170.

*To all whom it may concern:*

Be it known that I, EDWIN I. HEINSOHN, a citizen of the United States, residing at Cleveland, in the county of Cuyahoga and State of Ohio, have invented new and useful Improvements in Methods of and Apparatus for Electric Welding, of which the following is a specification.

The present invention relates to electric welding, more particularly as applied to the making of tubes, although it will be understood that the apparatus may be utilized wherever the edges of a blank are to be welded.

It has for its object to provide an efficient apparatus in which the work of welding may be conveniently and rapidly performed, the machine providing for practically a continuous operation and not being limited to blanks or tubes of any particular length. While the machine as illustrated in the present case is shown adapted for welding tubes of small diameter, it will be understood that it is applicable to the welding of tubes of any size, or indeed any forms of blanks, this involving only a change in size, shape, and proportion of the parts.

In order that the invention may be understood by those skilled in the art, I have shown in the accompanying drawings one embodiment of that invention, and in said drawings,—

Figure 1 is a view in front elevation of a machine embodying my invention. Fig. 2 is a view in side elevation of the machine shown in Fig. 1. Fig. 3 is a detail view of a tube guide. Fig. 4 is a detail view illustrating the tube, core and carrier as they come to the welding point.

Referring to the drawings by numbers, like numbers indicating like parts in the several views, 10 denotes conductor bars which are made of metal of low ohmic resistance, preferably copper, these bars being held together in any suitable manner as by tie rods or other suitable devices, insulated from the conductor bars, and these conductor bars will be connected in any suitable manner to a transformer secondary conductor which may have the usual C-shape or may be given any desired form and provided, of course, with a primary winding.

Mounted on the conductor bars, and preferably integral therewith, are heads 11 to which heads are secured suitable slide strips 12 to form a slide-way for the welding instrumentalities. Mounted in the upper slide-way just described, is a slide 13 provided with a bearing in which is journaled a revoluble electrode 14, this electrode being preferably mounted in a block 15 which may be turned on a vertical pivot 16 so as to enable the electrode 14 to be set either parallel with or in angular relation to the line of travel of the work, it being shown in the present instance as set angularly or askew relative to the work, suitable means, as set-screw 17, being provided to hold the block 15 in any position of adjustment. The said block 15 is provided with a weighted lever 18 pivotally mounted in an arm extending from the conductor bar, a link 19 connecting the short end of the lever with the block 15 so that the weight tends always to hold the block and electrode to the work and obviously the pressure of the electrode upon the work may be varied by varying the weight or the leverage.

Adjustably mounted in the slide-way of the lower head 11 is a block 20 having two trunnion bars between which is mounted the revoluble electrode 21. This electrode in its present form is shown as a grooved wheel designed to support a follower or tube carrier 22 of copper having on its upper surface a curved seat of a size to fit the tube which is to be welded; it being understood that this tube carrier will be varied as to the diameter and shape of its seat dependent upon the work which is being done.

Between the electrodes 14 and 21 the tube 23 passes, being in contact therewith and being welded along the line 24 at the point of contact of the upper electrode 14 with the tube. This upper electrode when arranged askew, not only tends to draw together the edges of the tube into close contact so that a complete and finished weld at that point takes place but also has an abrading action on the joint being welded and serves always to keep the contact clean so that the full effect of the current is secured at the welding point. The tube 23 is provided with a core 25 of copper so that in connection with the tube carrier 22 a good conducting path for the current from the conductor bars is provided. The said core 25, as shown in Fig. 4, supports the tube in its lapped condition, with the lapped edges of the tube in contact with said core 25, being held to position by the electrode 14 and the guide rollers, presently to be described, and supported by the carrier 22 so that in this condition of the tube it will be in intimate contact with the core at the lap where the welding takes place and will also be in contact with the core 25 and the carrier 22 at a diametrically opposite point through a considerable area. This condition of the tube insures a flow of heating and welding current through the assembled parts which will be localized at the points to be welded, the result being that the lapped edges will be melted down and a perfect weld secured, the guide rollers, which will now be described, serving to bring the completed tube snug to the core as the welding takes place and the completed tube passes through the machine.

Mounted on the trunnion blocks which support the electrode 21 are adjustable brackets 26, these brackets being adjustable vertically by means of the slot and bolt adjustment 27, and being provided with clamping bolts 28 by means of which they are held to the trunnion blocks, the bolts 28 passing through slots in the brackets so as to permit horizontal adjustment of the brackets on the trunnion blocks. The said brackets 26 are suitably insulated from the trunnion blocks so as to prevent the current from the conductor bars passing to them, thereby confining the current to the electrode 21. Mounted in the said brackets 26 on either side of the path of travel of the work are guide rollers 29, two being shown in the present instance, and these are preferably arranged so as to hold the blank snugly together directly at the point where the welding takes place, the faces of these guide rollers 29 being concaved to conform to the shape of the tube.

Preferably I provide just in rear of the guide rollers and welding electrodes a preliminary guide to bring the tube to the proper position for welding, this guide being shown in detail in Fig. 3, and comprising the arm 30 mounted in a fixed position on the head 11 and insulated therefrom, the under surface of the arm 30 conforming to the shape of the tube and having the stepped surface 31 to engage the edges of the blank and guide them forwardly and downwardly to a position where they will lie with the edges overlapping and snug to the top of the core 25, in which condition they pass to the welding point and the weld is completed.

It will be understood that in operation the tube will be laid about the core 25 and placed in the tube carrier 22 and in this condition the assembled core and tube carrier will be inserted in the machine, suitable drawing means, conventionally shown as grippers 32 in the present case, being provided to draw the work past the electrodes. In this manner the work will be continuously fed to the machine and past the electrode, the joint being continuously welded as it comes to the welding point and being always held in proper position and proper welding pressure being always exerted by means of the devices above described.

This apparatus, constructed as above described, will permit of a continuous operation on pipes of any length, there being no limitation as to the length of the tube which may be handled, and as the overlapping edges of the tube are held always in welding contact a smooth and uniform weld results.

While I have shown a particular embodiment of my invention, it will be understood that this may be departed from within the limits of mechanical skill without departing from my invention and I, therefore, do not limit myself to the specific mechanical structures set forth as these are illustrative and not restrictive of my invention.

I claim—

1. The herein described method of electric welding which consists in bringing together the edges of the stock to be welded, supporting those edges by means of a conducting sustaining element, supporting the stock by means of a second conducting element and subjecting said edges to the action of a heating current.

2. The herein described method of electric welding which consists in bringing into contact the edges of a tubular blank, supporting those edges in overlapped condition by a core of conducting material, supporting said tubular blank and core by a carrier of conducting material, and then subjecting the edges of said tubular blank to the action of a heating current.

3. The herein described method of electric welding which consists in bringing the edges of a tubular blank into contact, supporting such edges in overlapped condition by a core of conducting material, supporting said tubular blank and core by a carrier of conducting material, and passing said tube, core and carrier between opposed electrodes.

4. The herein described method of electric welding which consists in bringing the edges of a tubular blank into contact, supporting such edges in overlapped condition by a core of conducting material, supporting said tubular blank and core by a carrier of conducting material, and passing said tube, core and carrier between opposed revoluble electrodes.

5. In a machine for electric welding, the combination with opposed electrodes, of a stock supporting core of conducting material, a stock supporting carrier of conducting material and means to bring into and maintain in contact the edges of the stock to be welded.

6. In a machine for electric welding, the combination with a pair of opposed electrodes, of a tube supporting core of conducting material, a tube and core carrier of conducting material, guiding means to maintain said tube with its edges in contact, and means for drawing said tube, core and carrier past said electrodes.

7. In a machine for electric welding, the combination with opposed electrodes, a stock supporting core of conducting material, a carrier for said stock and core of conducting material, guiding means adjacent the welding point to retain said stock with its edges in contact, and means for drawing said stock, core and carrier past said electrodes.

8. In a machine for electrically welding tubes, the combination with opposed electrodes, of an internal support of conducting material for a tubular blank, a carrier of conducting material for said tubular blank and core, means for maintaining said tubular blank with its edges in contact, and means for drawing said blank, core and carrier past said electrodes.

9. In a machine for electrically welding tubes, the combination with opposed revoluble electrodes, a core of conducting material for supporting said tubular blank in welding contact with one of said revoluble electrodes, a carrier of conducting material for said core and tubular blank supported by the other of said electrodes.

10. In a machine for electrically welding tubes, the combination with two revoluble electrodes, of a supporting core of conducting material for the tubular blank, a carrier of conducting material for said core and blank, said carrier being fitted to and guided by said second electrode.

11. In a machine for electrically welding tubes, the combination with a revoluble electrode, of an internal support of conducting material for the blank to be welded, a carrier of conducting material for said core and blank, and a second electrode having formed therein a seat to guide said carrier.

12. In a machine for electrically welding tubes, the combination with a revoluble electrode, of an internal support of conducting material for the blank to be welded, a carrier of conducting material for said core and blank, and a second revoluble electrode having formed therein a seat to guide said carrier.

13. In a machine for electrically welding tubes, the combination with an electrode, of an internal support of conducting material for the tubular blank to be welded, said support being in contact with said tubular blank directly at the welding point and at a point opposite thereto with interrupting air gaps between said points of contact.

14. In a machine for electric welding, the combination with opposed electrodes, of a stock-supporting core of conducting material, and a supporting carrier having a retaining seat formed therein to receive the stock and core.

In testimony whereof I have hereunto set by hand in presence of two subscribing witnesses.

EDWIN I. HEINSOHN.

Witnesses:
F. T. SMITH,
A. V. CUSHMAN.